R. HAMILTON.
AUTOMATIC SAMPLING DEVICE.
APPLICATION FILED NOV. 11, 1914.
1,151,682.
Patented Aug. 31, 1915.
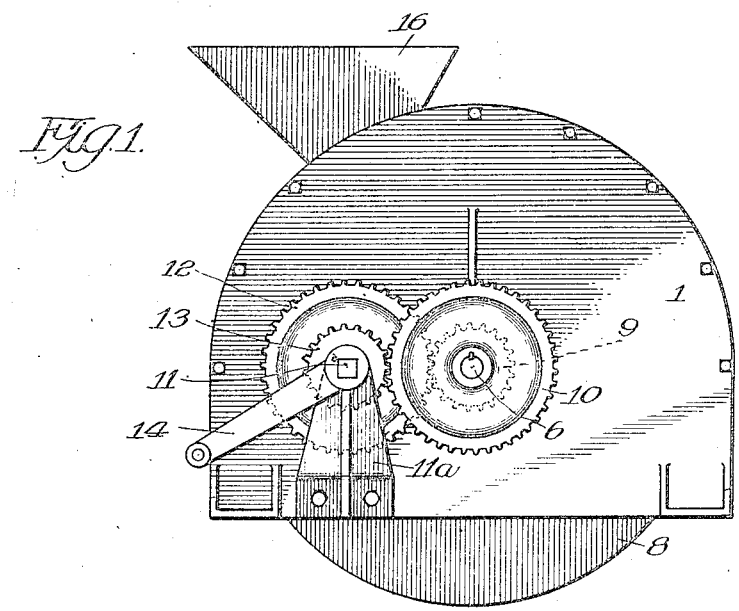
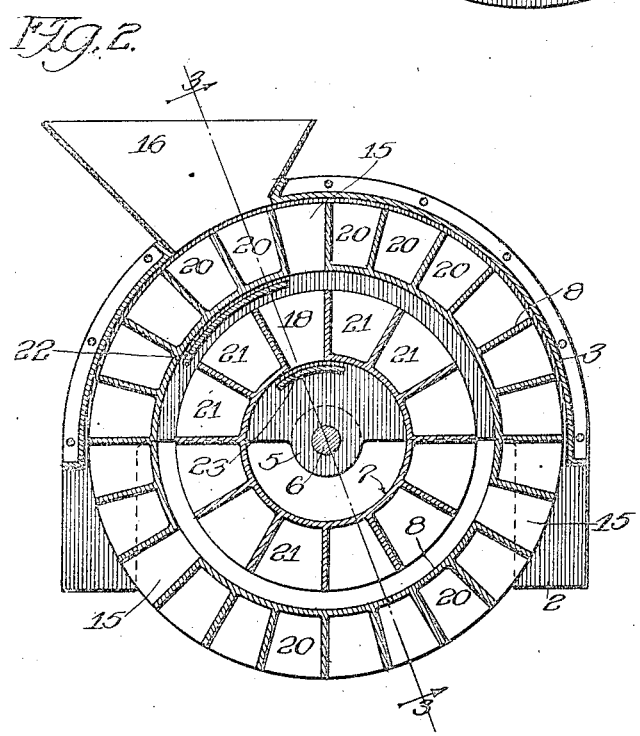
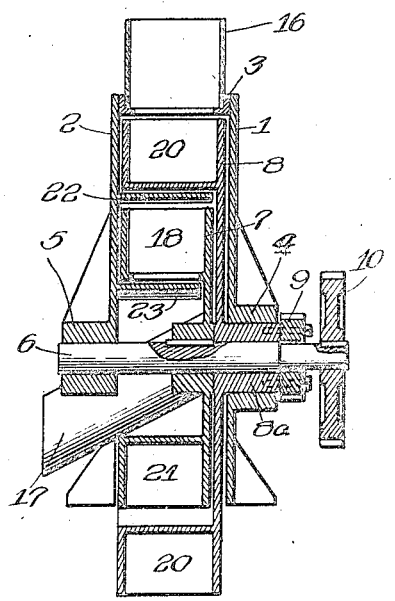
Witnesses:
Inventor:
Robert Hamilton

UNITED STATES PATENT OFFICE.

ROBERT HAMILTON, OF BIRMINGHAM, ALABAMA.

AUTOMATIC SAMPLING DEVICE.

1,151,682.

Specification of Letters Patent.   Patented Aug. 31, 1915.

Application filed November 11, 1914.   Serial No. 871,465.

*To all whom it may concern:*

Be it known that I, ROBERT HAMILTON, a citizen of the United States, and resident of Birmingham, in the county of Jefferson and State of Alabama, have invented certain new and useful Improvements in Automatic Sampling Devices, of which the following is a specification.

Frequently it is desired to select samples for testing purposes from different portions of a mass of material. Many devices have been suggested for accomplishing this result during the flow of the material, but many thereof are objectionable due to complexity and cost of manufacture.

One of the objects of my invention is to provide a simple, inexpensive device, by means of which fractional portions of a body of granular material may be selected without materially interrupting or interfering with the flow of the material. In the device here illustrated I automatically select a sample, divide this sample into four parts, then divide one of such four parts into twenty-four parts and select for sampling one of said twenty-four parts, the result being a selection of one-ninety-sixth (1-96th) of the material for testing purposes. I attain these objects by the mechanism illustrated in the accompanying drawings, in which—

Figure 1 is a side elevation showing the form of machine and arrangement of hopper, spur wheels, crank, etc.; Fig. 2 is a transverse section normal to the center shaft, and Fig. 3 is a section on line 3—3 of Fig. 2.

The sides 1 and 2 and the top 3, secured together, constitute the frame work of the machine. In the sides 1 and 2 are bearings 4 and 5 which carry a shaft 6, a cylinder 7 keyed to said shaft. Supported by, and freely rotatable on the same shaft 6, is another cylinder 8. Secured to or integral with the cylinder or bucket wheel 8 is a hollow trunnion or stub shaft 8ª which has a bearing for, and supports said shaft in the bearing 4. Fastened to the stub shaft 8ª at its outer end is a spur gear 9. At the outer or overhung end of the shaft 6 is keyed a spur gear 10. Secured to side 1, and in a bracket 11ª in suitable bearings, is a shaft 11. Keyed to this shaft are two spur gears 12 and 13 which mesh with gears 9 and 10 respectively on shaft 6. At the outer end of shaft 11 is a crank 14 for transmitting rotary motion to shaft 11. It will be observed that the revolution of the shaft 11 will cause revolution of the cylinders 7 and 8 within the frame work of the machines. The gears 9, 10, 12 and 13 are of such proportions that cylinder 8 makes four revolutions while cylinder 7 makes one in the same direction.

In the periphery of cylinder 8 are twenty-four pockets, three of which are open, the open spaces being indicated by the numerals 15, and are placed at equidistant position on the periphery of said cylinder, thus forming a series of seven closed pockets 20 between the open pockets 15. In the periphery of cylinder 7 are twelve pockets—eleven closed 21, and one open 18. On the top plate 3 is placed a hopper 16 of any suitable shape and size, into which is dumped the material to be sampled. Leading from the central portion of the machine is a chute 17, to carry off the material separated by the machine for testing. The lower portion of the machine is open to permit the material passing through the machine being carried away or piled.

The operation is as follows: The material to be sampled is fed into the hopper 16, and falls into the exposed pockets in the periphery of the cylinder 8. The crank 14 is then turned thus causing cylinders 7 and 8 to revolve in the same direction, cylinder 8 revolving four times as fast as cylinder 7. It will be observed that three times in every revolution of cylinder 8 the material falls through the open pockets into pockets in the cylinder 7, and that once in every four revolutions of cylinder 8, one open pocket 15, of same will register with open pocket 18 of cylinder 7 and allow material to fall through said pocket 18 into chute 17 and be carried away for testing purposes. Material falling into closed pockets 20 is carried to the underside of cylinder 8 and discharged. Material falling through pockets 15 into pockets 21 is carried to the underside of the cylinder and discharged onto the inner face of cylinder 8 and finally falls out through open pockets 15 where they are in the downward positions, into a suitable receiver. At each revolution three samples of every twenty four from cylinder 8 are discharged into cylinder 7, and one sample out of ninety six fed into the machine finds its way out through cylinder 7 into chute 17, and into the lot received for testing. To prevent the material from passing directly through pocket 15 into 18 while cylinder 8 is revolving past hopper 16 a stop 22 is cast integral with side 2 of the frame. Also stop 23 is cast integral with the frame in the position shown to carry material discharged into pocket 18 to be discharged into chute 17.

I do not limit my invention to the exact form and arrangement shown, but consider such modifications as are within the scope of my claims as being within the spirit of my invention.

I claim:

1. In a sampling device, a plurality of bucket wheels, one being mounted for rotation within another, means for rotating said wheels at different speeds, at least one of the buckets on the periphery of each wheel being open at the bottom to permit the passage of its portion of the material toward the axis of the wheel, substantially as described.

2. In a sampling device, the combination of a casing, a plurality of concentric bucket wheels mounted for rotation within said casing, at least one of the buckets in the periphery of each wheel being open at the bottom to permit the passage toward the axis of the wheels of its portion of the material fed, and means for rotating said wheels at different speeds, substantially as described.

3. In a sampling device, the combination of a casing, a pair of wheels concentrically mounted within said casing, said wheels being provided with a plurality of pockets in their peripheries, at least one of said pockets being open at the bottom, means for rotating said wheels at different speeds, and a baffle for preventing the direct passage of material to the interior through registering open spaces, substantially as described.

Signed at Birmingham this fourth day of November, 1914.

ROBERT HAMILTON.

Witnesses:
  WM. RICHARDSON, Jr.,
  E. D. LEMOY.